United States Patent [19]
Nickel

[11] 3,832,723
[45] Aug. 27, 1974

[54] EXPOSURE CONTROL DEVICE FOR PHOTOGRAPHIC CAMERAS

[75] Inventor: Werner Nickel, Sinn, Germany

[73] Assignee: Ernst Leitz GmbH, Westzlar, Germany

[22] Filed: Apr. 19, 1973

[21] Appl. No.: 352,652

[30] Foreign Application Priority Data
Apr. 21, 1972 Germany.......................... 2219523

[52] U.S. Cl. ............................................... 354/51
[51] Int. Cl. ............................................ G03b 7/08
[58] Field of Search......... 95/10 CT, 53 EA, 53 EB; 354/51, 258, 267

[56] References Cited
UNITED STATES PATENTS
3,727,526  4/1973  Hinds................................... 95/10

Primary Examiner—Samuel S. Matthews
Assistant Examiner—Michael L. Gellner
Attorney, Agent, or Firm—Krafft & Wells

[57] ABSTRACT

A photographic camera having a shutter, a shutter opening mechanism, a shutter closing mechanism, an exposure control device depending on the charged state of an RC circuit with a photoconductor cell therein exposed during film exposure, and wherein a threshold limit switch is connected after the RC circuit, a first electromagnet is inserted in the output circuit of the limit switch, and this magnet actuates the shutter closing mechanism. The exposure control device is improved by having therein means for digital counting connected between the limit switch and the first electromagnet for selecting film sensitivity, the outputs of the counting means being selectively connectible with circuit elements which vary the current supply to the first electromagnet and simultaneously short circuit the charging capacitor of the RC circuit.

3 Claims, 1 Drawing Figure

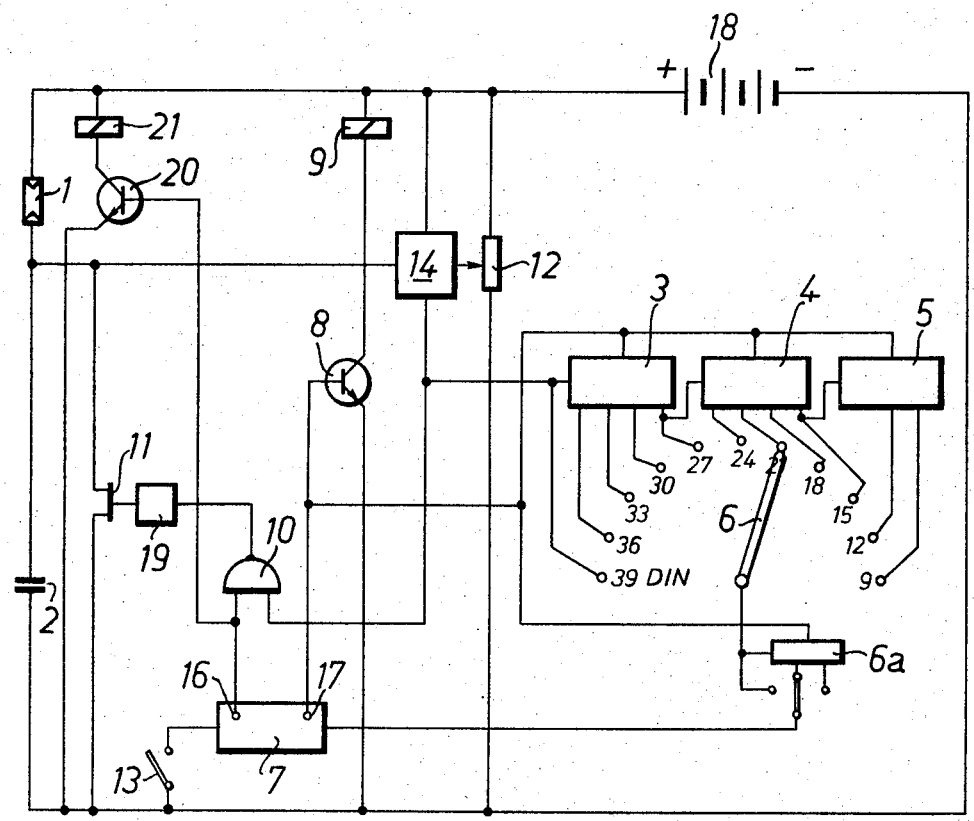

EXPOSURE CONTROL DEVICE FOR PHOTOGRAPHIC CAMERAS

CROSS REFERENCES TO RELATED APPLICATIONS

Applicant claims priority under 35 U.S.C. 119 for Application Serial No. P 22 19 523.9, filed Apr. 21, 1972 in the Patent Office of the Federal Republic of Germany.

The disclosure of assignee's copending Application Ser. No. 346,576, filed Mar. 30, 1973, now U.S. Pat. No. 3,785,264, entitled "SwingingSector Camera Shutter with Improved Warning Indicator", and having as inventors Peter Loseries and Toshio Hayashi, is incorporated herein. The patent of Loseries et al., discloses, among other things, an automatic exposure control device for photographic cameras having an RC circuit therein.

BACKGROUND OF THE INVENTION

The field of the invention is camera shutters with delayed releasers. The invention particularly relates to an automatic exposure control device for photographic cameras wherein the exposure control depends on the potential state of an RC circuit having a photoconductive cell, where the latter is exposed during the film exposure.

The state of the art of photographic cameras having electronic control of the exposure time may be ascertained by reference to U.S. Pat. Nos. 3,450,015; 3,504,611; and 3,692,393. The disclosures of these patents are incorporated herein.

U.S. Pat. No. 3,450,015 discloses a photographic camera having a shutter, a shutter drive mechanism and release mechanism therefor, the provision of an exposure time and delayed action control circuit having:

a. a source of electrical energy, b. a first electromagnetic means which when energized prevents the actuation of said shutter drive mechanism until deenergized, c. a first switch in series with first electromagnetic means closeable by said release mechanism in the selected case of delayed action, d. a second electromagnetic means which when energized retains the shutter drive mechanism in the open position, e. a second switch connected in series with the first switch, f. an electronic switch for actuating and energizing first or second electromagnetic means dependent on the position of said second switch, connected to the first switch and actuated by the shutter drive mechanism during the opening of the shutter, enabling first and second switches, the electronic switch and either first or second electromagnetic means to be connected in series across the source, the changeover of connection from first to second electromagnetic means being initiated by the shutter drive mechanism as the shutter opens, g. an oscillator circuit coupled to the electronic switch which triggers the latter when the oscillator circuit is in oscillation, h. a resistance capacitance exposure timing network providing as the capacitor charges an increasing bias voltage, said bias voltage being utilized to initiate the operation of said oscillator circuit, i. an additional resistor for controlling the delayed action time of the circuit in conjunction with the capacitance of said resistance capacitance exposure timing network, and j. a third switch having its wiper connected to the junction of first and second switches and actuated by the shutter drive mechanism, said third switch being normally connected to the delayed action timing resistor, said resistor being in series with said capacitor, the operation of the shutter drive mechanism disconnecting the wiper from said delayed action timing resistor and connecting it to said exposure timing network.

U.S. Pat. No. 3,504,611 defines a photographic camera comprising shutter means; electronically controlled timing means controlling exposure times of said shutter means; locking means operable by said timing means to lock said shutter means in the open position; an additional electronic device on said camera; and a second locking device engageable with said shutter means, said second locking device being operable by said additional electronic device for retarding the opening motion of said shutter means for a certain time period upon the release of said shutter means and wherein said additional electronic device has circuit means connected in parallel to said timing means, and said additional electronic device has an electromagnet controllable by said circuit means; and wherein said second locking device is operable by said electromagnet and has a locking lever engageable against the force of a biasing member with the shutter blade actuating member of said shutter means, said locking lever being operable to be locked into engagement with said shutter blade actuating member and wherein after the elapse of the delay period, said second locking device is released by said electromagnet and said locking lever changes over into a position which allows the runoff of said shutter means.

U.S. Pat. No. 3,692,393 defines a timing network connectable across a manually operable trigger member of a motion picture camera for affecting energization of the driving motor and the releasing apparatus of said camera after a predetermined interval and for limiting energization of said motor to another predetermined interval while said releasing member is in an of position, comprising first and second transistor means, each including a base, an emitter and a collector electrode and connected for alternate conduction, a delay circuit including a differential portion connected to the base electrode of said first transistor means for firing said first transistor means after a predetermined time period, said second transistor means being fired after said first transistor means is fully conductive, said timing network including a limiting portion for limiting energization of said motor to a predetermined scene interval, said limiting portion comprising differential network including a capacitor means and a variable resistor means connected to said capacitor means to vary the charging time thereof, said limiting portion being connected between the collector circuit of said first transistor means and the base electrode of said second transistor means.

In such control devices, the exposure time is formed automatically, primarily depending on the luminous intensity ambient on the photoconductive cell. However, in addition thereto, the exposure time also depends on various exposure parameters, such as, for example, the film sensitivity and the preselected shutter speed. These parameters must be fed to the control device by a special setting of the latter and must be taken into account.

For this purpose, it has been known to vary the capacitance of the capacitor in the RC circuit. Another possibility for introducing these parameters resides in changing the trigger threshold of the limit switch which is connected after the RC circuit in such exposure control devices. It is, of course, also possible to use both measures simultaneously.

In the case of photographic instruments which must meet higher requirements, e.g. in case of a device wherein films having a film sensitivity of 9 DIN as well as films having a sensitivity of 39 DIN are to be usable, an inordinately large amount of space is, however, required for this purpose.

The DIN number for the German film sensitivity is explained in "Römpps Chemisches Woerterbuch" as follows:

"The general sensitivity (against white light) is indicated in DIN values. An increase by 3 DIN means a rise of the sensitivity by twice the value, a reduction by 3 DIN means a drop to half the value. The sensitivity of the exposure layers reaches approximately from 12 to 33 DIN, i.e., a film of 12 DIN must be exposed for one second in order to achieve the same shading as with a film of 35 DIN in 1/125 second."

Since the exposure time, with a difference of 3 DIN, rises or drops, respectively, by the factor 2 the control device for such a device must be adjustable in the ratio of $1 : 10^2 = 1 : 1024$. This, however, would be possible with a capacitor having a variable capacitance only in the case of a very large structure. In such a case, then, a portion of the capacitors would have to be so large that such a device would no longer be practicable and marketable.

Therefore, there is the problem of providing an exposure control device of the above-mentioned type wherein a very wide range of possibilities for adjusting the exposure parameters is available, but which is small in physical dimensions and is easily realizable from a commercial viewpoint.

SUMMARY OF THE INVENTION

According to the present invention, this problem of the prior art is solved by providing that at least one digital counter for selecting the film sensitivity is connected between the trigger and the electromagnet and the outputs of this digital counter are selectively connectable with circuit elements varying the current supply to the electromagnet and the charging capacitor of the RC circuit is simultaneously short circuited.

Thus, it is possible to increase the input possibilities with each additional counter by the factor $2^n$ (wherein $n$ is the number of counter outputs) by the series connection of several digital counters and this opens up a broad range of possibilities in a simple way, especially for the selection of the film sensitivity.

If it is desired to include further parameters in the selection, it is possible to connect additional counters between the tapped output of the digital counters and the closing electromagnets and/or the circuit components which counters, as required, are either binary counters or decimal counters, but in any event digital counters.

BRIEF DESCRIPTION OF THE DRAWINGS

Additional details of the invention will be explained in greater detail with reference to the embodiment shown in the drawing, illustrating the circuit of a device wherein the shutter is opened by means of an opening electromagnet and closed again by means of a closing electromagnet.

DESCRIPTION OF THE PREFERRED EMBODIMENT

The circuit contains, as the essential structural component, an RC circuit consisting of a photoconductive cell 1 and a charging capacitor 2. The potential of the capacitor controls a threshold limit switch 14 consisting of an amplifier with a trigger.

The limit switch is associated with two sixteens digital counters 3 and 4 followed by a double flip-flop 5. Since the counters have the known property that each subsequent output is conductive when the number of pulses led has doubled, the eight outputs of the counters, together with the first counter input and the double flip-flop 5 connected thereafter, provide the possibility of doubling the exposure time ten times, i.e. to vary the same in the ratio of $1 : 2^{10}$. When these counters are used for selecting the film sensitivity, as also provided, this means that the film sensitivity in a range of 30 DIN can be taken into account, i.e., for example from 9 to 39 DIN.

The outputs of the counters contact a selector switch 6, the wiper of which can be set to any one of the outputs. An additional counter is connected after the selector switch for feeding further exposure parameters. In the present embodiment, this component is a decimal counter 6a serving for the consideration of lengthening factors, as they are required, for example when the format is changed. A flip-flop 7 is connected with this further switch. This flip-flop has two outputs 16 and 17. One output 16 leads to one of the inputs of a NAND gate 10 and, from the output thereof, to the base of a field effect transistor 11 connected in parallel, as the short circuit switch, with the charging capacitor 2. Via a transistor 20, an opening electromagnet 21 is likewise connected to this input 16, which opens the shutter when the device is activated. The other input of the NAND gate 10 is connected to the output of the limit switch 14. In the other output 17, a holding electromagnet 9 is connected with the interposition of a second transistor 8, which electromagnet closes the shutter at the end of the exposure time.

Furthermore, a potentiometer 12 is provided, the tap of which activates the limit switch, so that the trigger threshold thereof can be set via the potentiometer.

The circuit described above operates as follows:

In the rest condition, the charging capacitor 2 is bridged by the conductive field effect transistor 11 having low-ohmic resistance. The field effect transistor 11 obtains its voltage appropriate for the conductive condition via a level converter 19 and via the NAND gate 10 from the output 16 of the flip-flop 7. The output voltage of the limit switch 14 is high in the rest condition (L) and, therefore, the flip-flop output 16, with its low (O) potential, determines the output function of the gate and thus the condition of the field effect transistor. The output of the gate has 1 potential.

The counters, 3, 4, as well as the double flip-flop 5 are set by the output potential (L) of 17 of the flip-flop 7, i.e. no information is contained in the counters.

The flip-flop 7 switches over by the actuation of the starter key 13. The potentials of 16 and 17 are changed. 16 becomes L and 17 becomes O. The counters are now ready for counting, due to the O potential at the setting inputs. The field effect transistor 11 is blocked by the O potential at the output of the NAND gate 10 by way of the level converter 19. Thereby, the capacitor 2 is charged by means of the photoelectric current from the photoconductive cell 1.

Simultaneously, the shutter is opened via the transistor 20 and the opening electromagnet 21. Once the voltage at the capacitor 2 reaches the switching threshold of the limit switch 14 set by means of the potentiometer 12, the output of the switch switches L potential to O potential, and the field effect transistor 11 becomes conductive via the NAND gate 10 and the level converter 19. The L signal of the limit switch 14 can become effective, because the output 16 of the flip-flop 7 is on L potential.

Since the field effect transistor 11 has now become low-ohmic, the capacitor 2 is discharged. The output of the limit switch 14 switches back.

When the wiper of the switch 6 is directly connected to the output of the limit switch, the flip-flop 7 is likewise switched back, together with the return of the limit switch to its original switching state. The exposure operation is thus terminated, since also the shutter closes due to the switch-over of the flip-flop via the transistor 11 and the closing electromagnet 9.

If the wiper is not in the first position, but in some other position of the switch 6, the charging and discharging of the capacitor is repeated until a signal appears at the connected counter output, and only then is the flip-flop switched back.

Since, for the appearance of a signal at adjacent outputs respectively twice or half the number of signals is required, the adjustment of the wiper of switch 6 into an adjacent position for a different DIN setting in each case lengthens the exposure time to twice the value or shortens this time to half the value, which corresponds respectively to a film sensitivity different by 3-DIN-values.

I claim:

1. A photographic camera having a shutter, a shutter opening mechanism, a shutter closing mechanism, an exposure control device actuated by the charged state of an RC circuit having a charging capacitor (2) and a photoconductive cell (1) connected in series therein, said photoconductive cell exposed during film exposure, a limit threshold switch )14) connected in series with said RC circuit, an output circuit connected in series with said limit switch, a first electromagnet inserted in series with said output circuit, said first electromagnet actuating said shutter closing mechanism, means for digital counting (3,4) connected in series with said limit switch and said first electromagnet (9) for selecting film sensitivity, said means for digital counting having outputs selectively connectable in series with a plurality of circuit elements (7,10,11) which vary the current supply to said first electromagnet (9) and simultaneously short circuit said charging capacitor (2) of the RC circuit, said means for digital counting comprising a plurality of digital counters (3,4) connected in series, a further digital counter (6a) connected in series between said digital counters and said circuit elements for the feeding of selected additional exposure constants, said circuit elements comprising a flip-flop (7) with two outputs (16,17), said first electromagnet (9) which closes the shutter being connected to one of said outputs (17) thereof in series with a first transistor switch (8), and a second transistor switch (11) short circuiting said charging capacitor (2) being connected in series with the other output (16) of said flip-flop, in series with a NAND gate (10) additionally controlled by the limit switch.

2. The camera of claim 1, wherein in addition to said first electromagnet a second electromagnet actuates the shutter opening mechanism and is connected, via a transistor switch (20), to the other output (16) of the flip-flop (7) in front of the NAND gate (10).

3. The camera of claim 2, wherein a potentiometer (12) is provided for adjusting the threshold of the limit switch, the limit switch being controlled by the tap of this potentiometer.

* * * * *